(12) United States Patent
Parikh et al.

(10) Patent No.: US 8,373,708 B2
(45) Date of Patent: Feb. 12, 2013

(54) VIDEO PROCESSING SYSTEM, METHOD, AND COMPUTER PROGRAM PRODUCT FOR ENCRYPTING COMMUNICATIONS BETWEEN A PLURALITY OF GRAPHICS PROCESSORS

(75) Inventors: Amit D. Parikh, Santa Clara, CA (US); Haixia Shi, Sunnyvale, CA (US); Franck R. Diard, Mountain View, CA (US); Xun Wang, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 710 days.

(21) Appl. No.: 12/182,776

(22) Filed: Jul. 30, 2008

(65) Prior Publication Data

US 2010/0026689 A1 Feb. 4, 2010

(51) Int. Cl.
*G06F 15/16* (2006.01)
(52) U.S. Cl. ........ 345/502; 345/503; 345/505; 345/506; 713/190
(58) Field of Classification Search .......... 345/502–506; 713/190
See application file for complete search history.

(56) References Cited

U.S. PATENT DOCUMENTS

| | | | | |
|---|---|---|---|---|
| 5,864,680 A * | 1/1999 | Edblad et al. | ................. | 709/242 |
| 6,956,579 B1 * | 10/2005 | Diard et al. | ................... | 345/537 |
| 7,065,651 B2 | 6/2006 | Evans | | |
| 7,107,459 B2 * | 9/2006 | Caronni et al. | ............... | 713/190 |
| 7,159,112 B1 * | 1/2007 | Williams | ..................... | 713/168 |
| 7,299,365 B2 | 11/2007 | Evans | | |
| 7,466,316 B1 | 12/2008 | Alben et al. | | |
| 8,319,780 B2 | 11/2012 | Parikh et al. | | |
| 2002/0025036 A1 * | 2/2002 | Sato | ............................... | 380/42 |
| 2003/0025648 A1 | 2/2003 | Glen et al. | | |
| 2003/0135742 A1 | 7/2003 | Evans | | |
| 2003/0184549 A1 * | 10/2003 | Kim et al. | ...................... | 345/503 |
| 2004/0111627 A1 * | 6/2004 | Evans et al. | ................... | 713/189 |
| 2005/0154903 A1 | 7/2005 | Evans | | |
| 2005/0190190 A1 | 9/2005 | Diard et al. | | |
| 2006/0132491 A1 | 6/2006 | Riach et al. | | |
| 2007/0013702 A1 | 1/2007 | Hiroi et al. | | |
| 2007/0097133 A1 * | 5/2007 | Stauffer et al. | ............... | 345/502 |
| 2007/0273699 A1 | 11/2007 | Sasaki et al. | | |
| 2008/0030507 A1 * | 2/2008 | Herz | ............................. | 345/502 |
| 2008/0030510 A1 * | 2/2008 | Wan et al. | ..................... | 345/505 |
| 2008/0117222 A1 * | 5/2008 | Leroy et al. | ................... | 345/522 |
| 2010/0171629 A1 | 7/2010 | Lee | | |

FOREIGN PATENT DOCUMENTS

| | | |
|---|---|---|
| EP | 1801725 A2 | 6/2007 |
| JP | 6149694 A | 5/1994 |
| JP | 2002207713 A | 7/2002 |
| JP | 2007310883 A | 11/2007 |

(Continued)

OTHER PUBLICATIONS

Non-Final Office Action from U.S. Appl. No. 12/182,820 dated May 10, 2011.

(Continued)

*Primary Examiner* — Xiao M. Wu
*Assistant Examiner* — Todd Buttram
(74) *Attorney, Agent, or Firm* — Zilka-Kotab, PC

(57) ABSTRACT

A video processing system, method, and computer program product are provided for encrypting communications between a plurality of graphics processors. A first graphics processor is provided. Additionally, a second graphics processor in communication with the first graphics processor is provided for collaboratively processing video data. Furthermore, such communication is encrypted.

24 Claims, 8 Drawing Sheets

FOREIGN PATENT DOCUMENTS

JP 2008090889 A 4/2008

OTHER PUBLICATIONS

Notice of Preliminary Rejection from Korean Patent Application No. 10-2009-0069528 dated Feb. 24, 2011.
Office Action from Chinese Patent Application No. 200910149042.0 dated Jun. 2, 2011.
Yan, S., "Analysis on 'Hybrid' Graphics Card," China Academic Journal Electronic Publishing House, Mar. 2008, pp. 52-53.
Advisory Action from U.S. Appl. No. 12/182,820, dated Dec. 19, 2011.
Notice of Preliminary Rejection from Japanese Patent Application No. 2009-120031, dated Dec. 13, 2011.
Final Office Action from U.S. Appl. No. 12/182,820, dated Oct. 18, 2011.
Notice of Final Rejection from Korean Patent Application No. 10-2009-0069528, dated Oct. 31, 2011.
Non-Final Office Action from U.S. Appl. No. 12/182,820, Feb. 16, 2012.
Office Action from Chinese Patent Application No. 200910149042.0, dated Mar. 7, 2012.
Decision to Grant from Japanese Patent Application No. 2009-120031, dated May 29, 2012.
Notice of Allowance from Korean Patent Application No. 10-2009-0069528, dated Mar. 23, 2012.
Final Office Action from U.S. Appl. No. 12/182,820, dated Jul. 19, 2012.
Decision on Rejection from Chinese Patent Application No. 200910149042.0, dated Aug. 13, 2012.
Hybrid SLI Technology http://www.nvidia.com/object/hybrid_sli_desktop.html Jun. 7, 2008.
Notice of Allowance from U.S. Appl. No. 12/182,820, dated Oct. 11, 2012.

* cited by examiner

# VIDEO PROCESSING SYSTEM, METHOD, AND COMPUTER PROGRAM PRODUCT FOR ENCRYPTING COMMUNICATIONS BETWEEN A PLURALITY OF GRAPHICS PROCESSORS

FIELD OF THE INVENTION

The present invention relates to video processing, and more particularly to video processing in hybrid environments.

BACKGROUND

In conventional computing environments, video processing is often carried out by graphics processors. To enhance such video processing, the processing is often distributed among a plurality of different graphics processors. However, such distributed processing environments have generally exhibited various limitations. For example, communications between distributed graphics processors are oftentimes vulnerable to unwanted access to the communications and even unwanted alterations to the communications.

There is thus a need for addressing these and/or other issues associated with the prior art.

SUMMARY

A video processing system, method, and computer program product are provided for encrypting communications between a plurality of graphics processors. A first graphics processor is provided. Additionally, a second graphics processor in communication with the first graphics processor is provided for collaboratively processing video data. Furthermore, such communication is encrypted.

DETAILED DESCRIPTION

Figure 1:
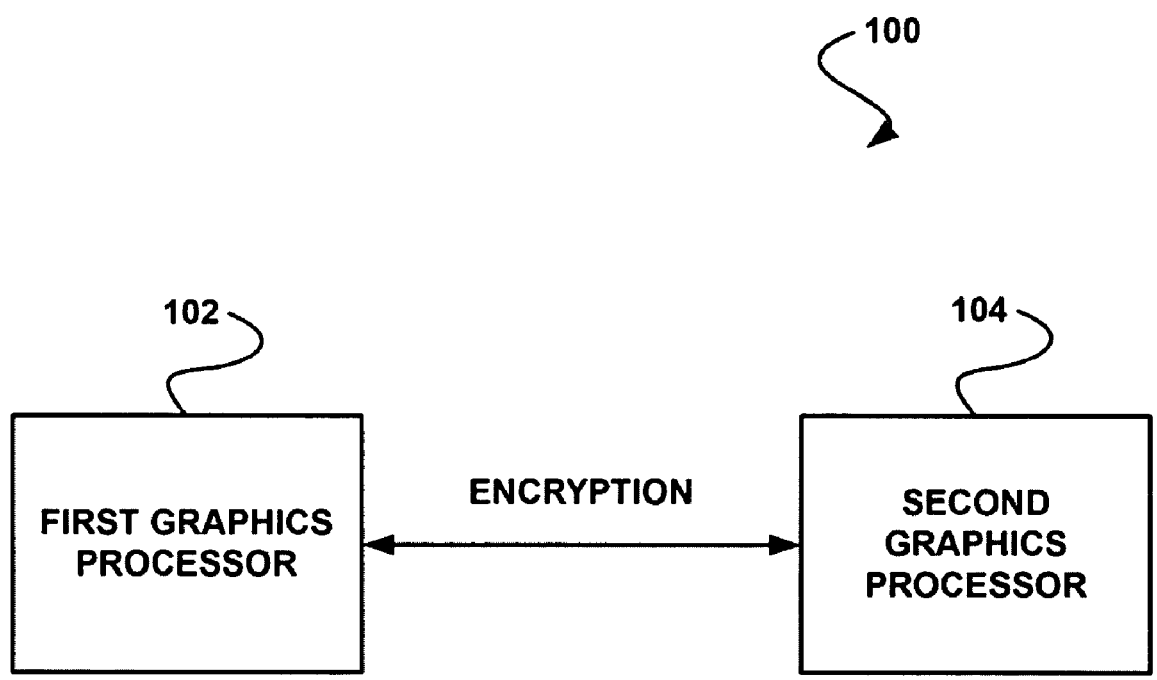
FIG. 1 shows a video processing system including a plurality of graphics processors, in accordance with one embodiment.

FIG. 1 shows a video processing system 100 including a plurality of graphics processors, in accordance with one embodiment. As shown, a first graphics processor 102 is in communication with a second graphics processor 104. In one embodiment, the first graphics processor 102 may be in communication with the second graphics processor 104 via a bus. For example, the bus may include a peripheral component interconnect (PCI) bus, a PCI express (PCIE) bus, etc. Of course, however, the first graphics processor 102 may be in communication with the second graphics processor 104 in any desired manner.

With respect to the present embodiment, the first graphics processor 102 and the second graphics processor 104 may include any type of graphics processors [e.g. graphics processing units (GPUs)] capable of processing video data. As an option, the first graphics processor 102 and the second graphics processor 104 may be symmetric. As another option, the first graphics processor 102 and the second graphics processor 104 may be asymmetric.

Additionally, in one embodiment, the first graphics processor 102 may include a discrete graphics processor. Optionally, the first graphics processor 102 may be dedicated to performing a predetermined task. Such predetermined task may include rendering video data (e.g. at least one frame of video received from an application, etc.), just by way of example. To this end, the first graphics processor 102 may be in communication with an application for receiving video data from the application for rendering purposes.

In another embodiment, the second graphics processor 104 may include an integrated graphics processor. For example, the second graphics processor 104 may be integrated on a host system (e.g. a system employing the first graphics processor 102 and the second graphics processor 104, etc.). As another example, the second graphics processor 104 may be integrated on a motherboard (e.g. of the host system).

The second graphics processor 104 may also be dedicated to performing a predetermined task different from the predetermined task dedicated to the first graphics processor 102, as an option. For example, the second graphics processor 104 may be dedicated to displaying and/or overlaying video data. Thus, the second graphics processor 104 may be in communication with a display for displaying and/or overlaying video data.

Accordingly, in one embodiment, the first graphics processor 102 and the second graphics processor 104 may be in communication for collaboratively processing video data. As an option, the first graphics processor 102 may perform at least a first type of processing of the video data and the second graphics processor 104 may perform at least a second type of processing of the video data. Just by way of example, the first graphics processor 102 may render the video data and the second graphics processor 104 may display the rendered video data.

As another option, the first graphics processor 102 may process a first portion of the video data and the second graphics processor 104 may process a second portion of the video data. Further, the first graphics processor 102 and the second graphics processor 104 may collaboratively process the vide data in any desired order. Of course, while various examples have been described above, it should be noted that the first graphics processor 102 and the second graphics processor 104 may collaboratively process the video data in any desired manner.

Moreover, while only one first graphics processor 102 and one second graphics processor 104 are shown, it should also be noted that any number of first graphics processors 102 may be in communication with any number of second graphics processors 104. Thus, as an option, a plurality of first graphics processors 102 (e.g. discrete graphics processors) may be included in the video processing system 100 for collaboratively processing the video data. Just by way of example, a plurality of first graphics processors 102 may collaboratively perform at least one predetermined task on the video data.

Furthermore, with respect to the above embodiment in which the first graphics processor 102 and the second graphics processor 104 are in communication for collaboratively processing video data, the communication between the first graphics processor 102 and the second graphics processor 104 may be encrypted. The communication may be encrypted in any desired manner. For example, the communication may be encrypted utilizing a turbo cipher encryption mechanism, a bit moving unit, bit scrambling (e.g. swapping bits via a pixel shader function, etc.), and/or any other algorithm capable of encrypting the communication.

In one exemplary embodiment, the first graphics processor 102 may process (e.g. decode) the video data. For example, the first graphics processor 102 may process the video data after receipt thereof (e.g. from the application). In addition, the video data may be encrypted. For example, the first graphics processor 102 may encrypt the video data after the decoding thereof. Moreover, the video data may be sent to the second graphics processor 104 for being further processed. Just by way of example, the first graphics processor 102 may encrypt the processed video data for communication thereof (e.g. over the bus) to the second graphics processor 104. In this way, upon receipt from the first graphics processor 102 of the encrypted video data by the second graphics processor 104, the second graphics processor 104 may decrypt the encrypted video data for processing of the decrypted video data.

In another exemplary embodiment, the first graphics processor 102 may process (e.g. decode) the video data. Additionally, a key (e.g. encryption key) may be provided (e.g. to the first graphics processor 102) for use in encrypting the video data. Still yet, the second graphics processor 104 may further process the video data. Optionally, the encrypted video data may be sent to the second graphics processor 104 for being further processed. As another option, the key may be provided to the second graphics processor 104 for use in decrypting the encrypted video data.

In one optional embodiment, the key may be provided to the first graphics processor 102 and/or the second graphics processor 104 by programming such first graphics processor 102 and/or second graphics processor 104 with the key. For example, the first graphics processor 102 and/or the second graphics processor 104 may be programmed with the key upon initialization (e.g. boot-up) of the first graphics processor 102 and/or second graphics processor 104.

In another embodiment, operation of the first graphics processor 102 and the second graphics processor 104 may be synchronized in order to secure communication therebetween. As an option, the communication may be secured by performing an encryption operation. For example, as noted above, the communication between the first graphics processor 102 and the second graphics processor 104 may be encrypted. As also noted above, the encryption operation may be performed on the video data to generate encrypted video data, for example.

As another option, synchronizing operation of the first graphics processor 102 and the second graphics processor 104 may include synchronizing (e.g. coordinating) processing performed by the first graphics processor 102 and the second graphics processor 104. Such processing may include transferring decoded video data from its own frame buffer to system memory by the first graphics processor 102. As another option, the processing may include reading the video data from the system memory by the second graphics processor 104 (e.g. for decrypting and/or display thereof). In this way, unwanted glitches in processing of the video data may be prevented by synchronizing the operation of the first graphics processor 102 and the second graphics processor 104.

As yet another option, a data structure (not shown) may be provided for use in synchronizing operation of the first graphics processor 102 and the second graphics processor 104 in order to secure communication therebetween. The data structure may include at least one semaphore, in one embodiment. Such semaphore may optionally include a location in memory for storing data (e.g. a 32 bit value).

For example, the semaphore may store data indicating to the first graphics processor 102 and/or the second graphics processor 104 when operation thereof (e.g. processing of the video data) may be initiated. To this end, the semaphore may be continuously, periodically, etc. polled by respective engines to be synchronized between the first graphics processor 102 and second graphics processor 104. Of course, it should be noted that the operation of the first graphics processor 102 and the second graphics processor 104 may be synchronized in any desired manner.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
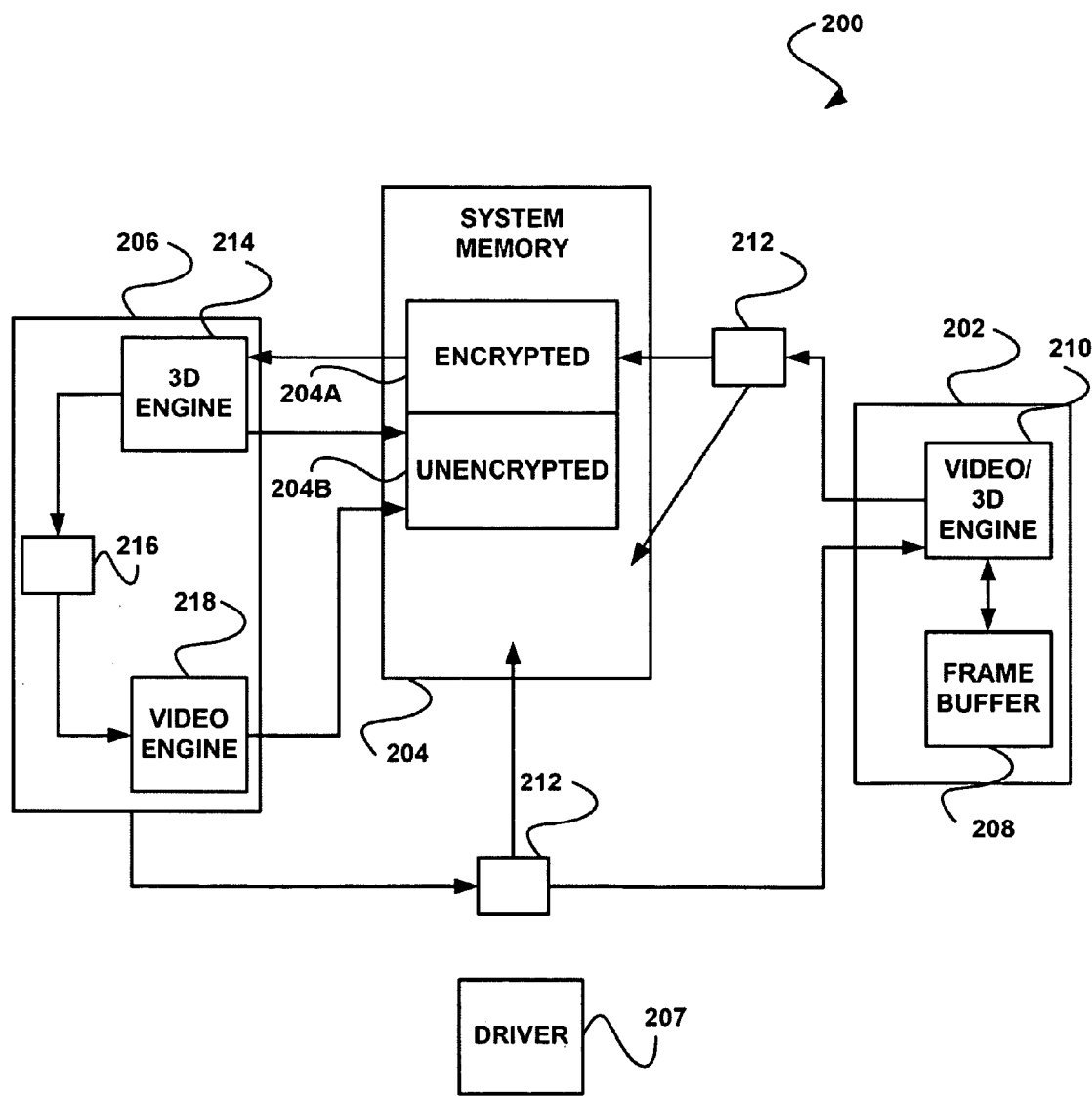
FIG. 2 shows a video processing system including a plurality of graphics processors, in accordance with another embodiment.

FIG. 2 shows a video processing system 200 including a plurality of graphics processors, in accordance with another embodiment. As an option, the present video processing system 200 may be implemented in the context of the video processing system 100 of FIG. 1. Of course, however, the video processing system 200 may be implemented in any desired environment. It should also be noted that the aforementioned definitions may apply during the present description.

As shown, a first graphics processor 202 (hereinafter discrete graphics processor 202) is in communication with a second graphics processor 206 (hereinafter integrated graphics processor 206). The discrete graphics processor 202 and the integrated graphics processor 206 are also in communication with system memory 204 which stores encrypted and decrypted video data. The system memory 204 may be included in a host system (not shown). Such communication (e.g. between the discrete graphics processor 202, the integrated graphics processor 206 and/or the system memory 204 may be provided over a bus, for example.

As an option, the discrete graphics processor 202 and the integrated graphics processor 206 may be controlled by a driver 207. For example, the driver 207 may include a plurality of components (e.g. computer code) for controlling the discrete graphics processor 202 and the integrated graphics processor 206. The driver 207 may optionally control the discrete graphics processor 202 and the integrated graphics processor 206 based on an application of the system on which the discrete graphics processor 202 and the integrated graphics processor 206 are located.

The driver 207 may generate a plurality of sequences of instructions (e.g. a batch of commands, etc.) and send such instructions to the discrete graphics processor 202 and/or the integrated graphics processor 206. With respect to the present embodiment, the instructions may instruct the discrete graphics processor 202 and/or the integrated graphics processor 206 to perform any of the operations described hereinbelow.

In one embodiment, the discrete graphics processor 202 may receive video data from an application (not shown). The application may include an interface to an input device [e.g. a digital video disc (DVD) player, etc.]. Thus, the discrete graphics processor 202 may receive the video data as input from the application. As an option, the received video data may be encoded (e.g. for protection purposes).

Upon receipt of the video data by the discrete graphics processor 202, the discrete graphics processor 202 may process the video data. For example, a video/3-dimensional (3D) engine 210 of the discrete graphics processor 202 may process the video data. Such processing may include decoding the video data, as an option. As another option, the processing may include storing the video data in a frame buffer 208 of the discrete graphics processor 202. As yet another option, the processing may include reading the video data from the frame buffer 208 of the discrete graphics processor 202, and rendering the video data.

As still yet another option, the processing may include encrypting the rendered video data. For example, the discrete graphics processor 202 may conditionally encrypt the video data based on a determination of whether the video data is to be encrypted. Such determination may be based on a command received from the driver 207, in one embodiment. For example, if the command references a virtual address associated with the system memory 204 at which the video data is to be stored, the discrete graphics processor 202 may utilize a page table to map the virtual address to an associated physical address in the system memory 204.

Further, the discrete graphics processor 202 may determine whether the physical address is predetermined to be associated with a portion of the system memory 204 that is protected with a key (e.g. encryption key). If the physical address is predetermined to be associated with the portion of the system memory 204 that is protected with the key, the discrete graphics processor 202 may encrypt the video data. In one embodiment, the discrete graphics processor 202 may be programmed with the key for use in encrypting the video data.

Still yet, the discrete graphics processor 202 may communicate with the system memory 204 for storing the encrypted video data in the system memory 204 (e.g. writing the encrypted video data to the system memory 204). As shown, the system memory 204 may include an encrypted portion 204A and an unencrypted portion 204B. The encrypted portion 204A may optionally include the portion of the system memory 204 that is protected with the key. As another option, the encrypted portion 204A may include a buffer for storing encrypted video data. As yet another option, the unencrypted portion 204B may include a portion of the system memory 204 that is not protected with the key. Such unencrypted portion 204B may optionally include a buffer for storing unencrypted video data.

To this end, the discrete graphics processor 202 may store the encrypted video data in the encrypted portion 204A of the system memory 204, for example, by writing the encrypted video data in the encrypted portion 204A of the system memory 204. In response to storing the encrypted video data in the system memory 204, the discrete graphics processor 202 (e.g. the video/3D engine 210 of the discrete graphics processor 202) may write a first semaphore 212 into the system memory 204. The first semaphore 212 may indicate that the encrypted video data has been stored in the system memory 204, and thus that the integrated graphics processor 206 may process the stored encrypted video data. For example, a predefined value associated with such indication may be stored in the first semaphore 212.

Moreover, the integrated graphics processor 206 may retrieve the encrypted video data from the system memory 204 (e.g. by reading the encrypted video data from encrypted portion 204A of the system memory 204). In one embodiment, the integrated graphics processor 206 may retrieve the encrypted video data from the system memory 204 based on the first semaphore 212. For example, the integrated graphics processor 206 may retrieve the encrypted video data from the system memory 204 only if the first semaphore 212 indicates that the encrypted video data has been stored in the system memory 204. In this way, the first semaphore 212 may be used for ensuring that the integrated graphics processor 206 refrains from retrieving the encrypted video data from the system memory 204 until the discrete graphics processor 202 has completed storing the encrypted video data in the system memory 204.

Thus, the first semaphore 212 may be continuously, periodically, etc. polled for determining whether the first semaphore 212 indicates that the encrypted video data has been stored in the system memory 204. As an option, the first semaphore 212 may be polled by a host processor (not shown) which schedules processing by the discrete graphics processor 202 and/or the integrated graphics processor 206. As another option, in response to a determination that the first semaphore 212 indicates that the encrypted video data has been stored in the system memory 204, the driver 207 may be commanded (e.g. by the host processor) to instruct the integrated graphics processor 206 to retrieve the encrypted video data from the system memory 204.

As shown, a 3D engine 214 (e.g. graphics engine) of the integrated graphics processor 206 may retrieve the encrypted video data from the system memory 204. Furthermore, the integrated graphics processor 206 (e.g. the 3D engine 214 of the integrated graphics processor 206) may process the retrieved encrypted video data. In one embodiment, the processing may include decrypting the encrypted video data. In another embodiment, processing may include storing the decrypted video data in the system memory 204 (e.g. by writing the decrypted video data to the system memory 204). For example, the decrypted video data may be stored in the unencrypted portion 204B of the system memory 204.

As an option, in response to storage of the decrypted video data in the system memory 204, the graphics processor 206 (e.g. the 3D engine 214 of the integrated graphics processor 206) may write a second semaphore 216 into local memory. The second semaphore 216 may indicate that the decrypted video data has been stored in the system memory 204, and thus that a video engine 218 of the integrated graphics processor 206 may process the decrypted video data or a display engine may display the decrypted video data. For example, a predefined value associated with such indication may be stored in the second semaphore 216. To this end, the video engine 218 and the 3D engine 206 of the integrated graphics processor 206 may be synchronized utilizing the second semaphore 216.

For example, the integrated graphics processor 206 (e.g. the video engine 218 of the integrated graphics processor 206) may retrieve the decrypted video data from the system memory 204 (e.g. by reading the decrypted video data from unencrypted portion 204B of the system memory 204). In one embodiment, the integrated graphics processor 206 may retrieve the decrypted video data from the system memory 204 based on the second semaphore 216. For example, the integrated graphics processor 206 may retrieve the decrypted video data from the system memory 204 only if the second semaphore 216 indicates that the decrypted video data has been stored in the system memory 204. Thus, the second semaphore 216 may be continuously, periodically, etc. polled for determining whether the second semaphore 216 indicates that the decrypted video data has been stored in the system memory 204. In this way, the second semaphore 216 may be utilized to coordinate processing by the integrated graphics processor 206 (e.g. by the 3D engine 214 and the video engine 218 of the integrated graphics processor 206).

Still yet, in response to retrieval of the decrypted video data by the integrated graphics processor 206, the integrated graphics processor 206 (e.g. the video engine 218 of the integrated graphics processor 206) may write to the second semaphore 216 for resetting the second semaphore 216. In addition, in response to retrieval of the decrypted video data by the integrated graphics processor 206, the integrated graphics processor 206 (e.g. the video engine 218 of the integrated graphics processor 206) may further process the decrypted video data. Such processing may include displaying the decrypted video data. For example, the video engine 218 of the integrated graphics processor 206 may be in communication with a display (not shown) for driving the display utilizing the decrypted video data.

Upon retrieval of the encrypted video data from the system memory 204 by the integrated graphics processor 206, the integrated graphics processor 206 may write the first semaphore 212 for indicating to the discrete graphics processor 202 that the encrypted video data has been retrieved. For example, a predefined value associated with such indication may be stored in the first semaphore 212. Accordingly, the first semaphore 212 may be utilized for determining whether encrypted video data has been retrieved from the system memory 204 by the integrated graphics processor 206 such that other encrypted video data may be stored in the system memory 204 (e.g. in the encrypted portion 204A of the system memory 204) by the discrete graphics processor 202. To this end, the first semaphore 212 may be utilized for coordinating processing by the discrete graphics processor 202 and the integrated graphics processor 206.

Figure 3:
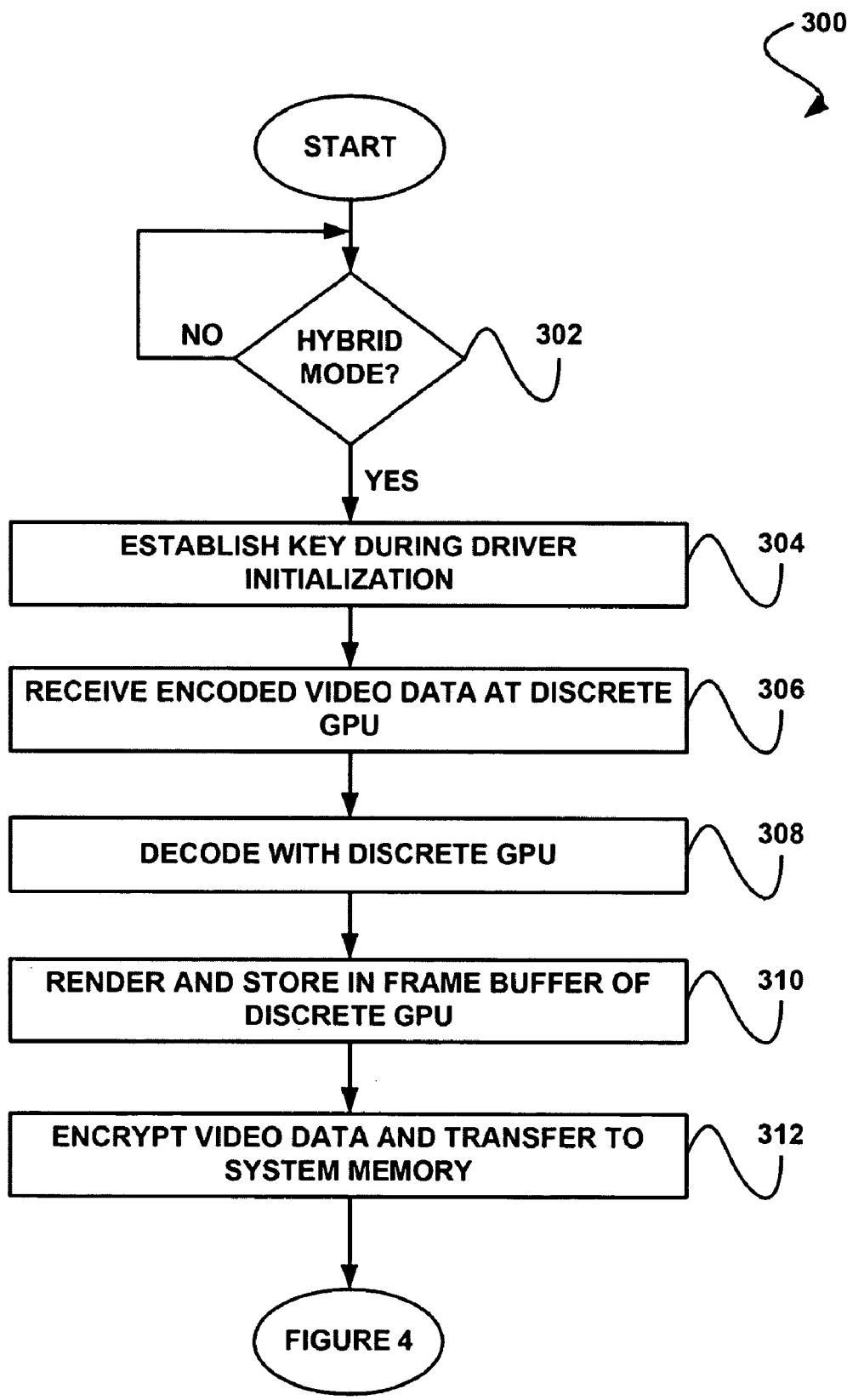
FIG. 3 shows a method for transferring encrypted video data to system memory utilizing a discrete graphics processing unit (GPU), in accordance with yet another embodiment.

FIG. 3 shows a method 300 for transferring encrypted video data to system memory utilizing a discrete graphics processing unit (GPU), in accordance with yet another embodiment. As an option, the present method 300 may be carried out in the context of the functionality and architecture of FIGS. 1-2. Of course, however, the method 300 may be carried out in any desired environment. Again, it should be noted that the aforementioned definitions may apply during the present description.

As shown in decision 302, it is determined whether a host system is operating in hybrid mode. With respect to the present embodiment, the host system may include a system that includes both a discrete GPU and an integrated GPU and that is capable of collaboratively processing video data utilizing the discrete GPU and the integrated GPU. Accordingly, determining whether the host system is operating in the hybrid mode may include determining whether both the discrete GPU and the integrated GPU are operating (e.g. initialized, enabled, etc.) on the host system. For example, the discrete GPU and the integrated GPU may be selectively utilized by the host system for processing video data.

If it is determined that the host system is not operating in hybrid mode, the method 300 waits for the host system to be operating in hybrid mode. If, however, it is determined that the host system is operating in hybrid mode, a key is established during driver initialization. Note operation 304. With respect to the present embodiment, the key may include any key capable of being utilized for encrypting video data.

In one embodiment, establishing the key may include programming the discrete GPU with the key. As an option, the integrated GPU may also be programmed with the key. For example, a driver of the host system may program the discrete GPU and the integrated GPU with the key.

In another embodiment, establishing the key during driver initialization may include establishing the key when the driver of the host system initializes the discrete GPU and/or the integrated GPU. Just by way of example, the driver may initialize the discrete GPU, and thus program the discrete GPU with the key, when the operating system of the host system is booted (e.g. powered up). As another example, the driver may initialize the integrated GPU, and thus program the integrated GPU with the key, when the host system is booted.

Additionally, encoded video data is received at the discrete GPU, as shown in operation 306. The encoded video data may include any video data that has been transformed from one format to another. For example, the video data may be encoded for protecting the video data from unwanted use thereof. As an option, the video data may be encoded by a publisher of the video data.

In one embodiment, the encoded video data may be received by an application. Just by way of example, the encoded video data may be received by an application interfacing the host system and an input device from which the video data is received by the host device. Such application may optionally be installed and executed on the host system.

Furthermore, as shown in operation 308, the video data is decoded with the discrete GPU. As an option, the video data may be decoded utilizing an algorithm known to the discrete GPU. For example, the video data may be decoded by transforming the video data from the second format (e.g. in which the video data is received) to the first format (e.g. capable of being displayed via the integrated GPU of the host system).

Still yet, the video data is rendered and stored in a frame buffer of the discrete GPU. Note operation 310. In one embodiment, the video data may be rendered by generating an image from the video data. Thus, the image may be stored in the frame buffer. Such frame buffer may optionally be designated for use solely by the discrete GPU. Thus, the discrete GPU may be the only device capable of writing data to and reading data from the frame buffer.

As also shown, the video data is encrypted and transferred to system memory. Note operation 312. In one optional embodiment, the video data may be read by the discrete GPU from the frame buffer of the discrete GPU for encrypting the video data. As an option, the video data may be encrypted utilizing the key established during the driver initialization (in operation 304).

Moreover, transferring the video data to the system memory may include writing the video data to the system memory. As an option, an instruction received from the driver instructing the discrete GPU to transfer the video data to system memory may indicate the location in the system memory to which the video data is to be transferred. For example, the instruction may include an indication of a virtual address associated with the system memory, the discrete GPU may translate the virtual address to a physical address utilizing a page table, and the discrete GPU may store the video data in the system memory at the physical address.

To this end, encrypted video data may be transferred to system memory utilizing the discrete GPU. Moreover, processing of the video data stored in the system memory may be further performed by the integrated GPU, as described below with respect to FIG. 4.

Figure 4:
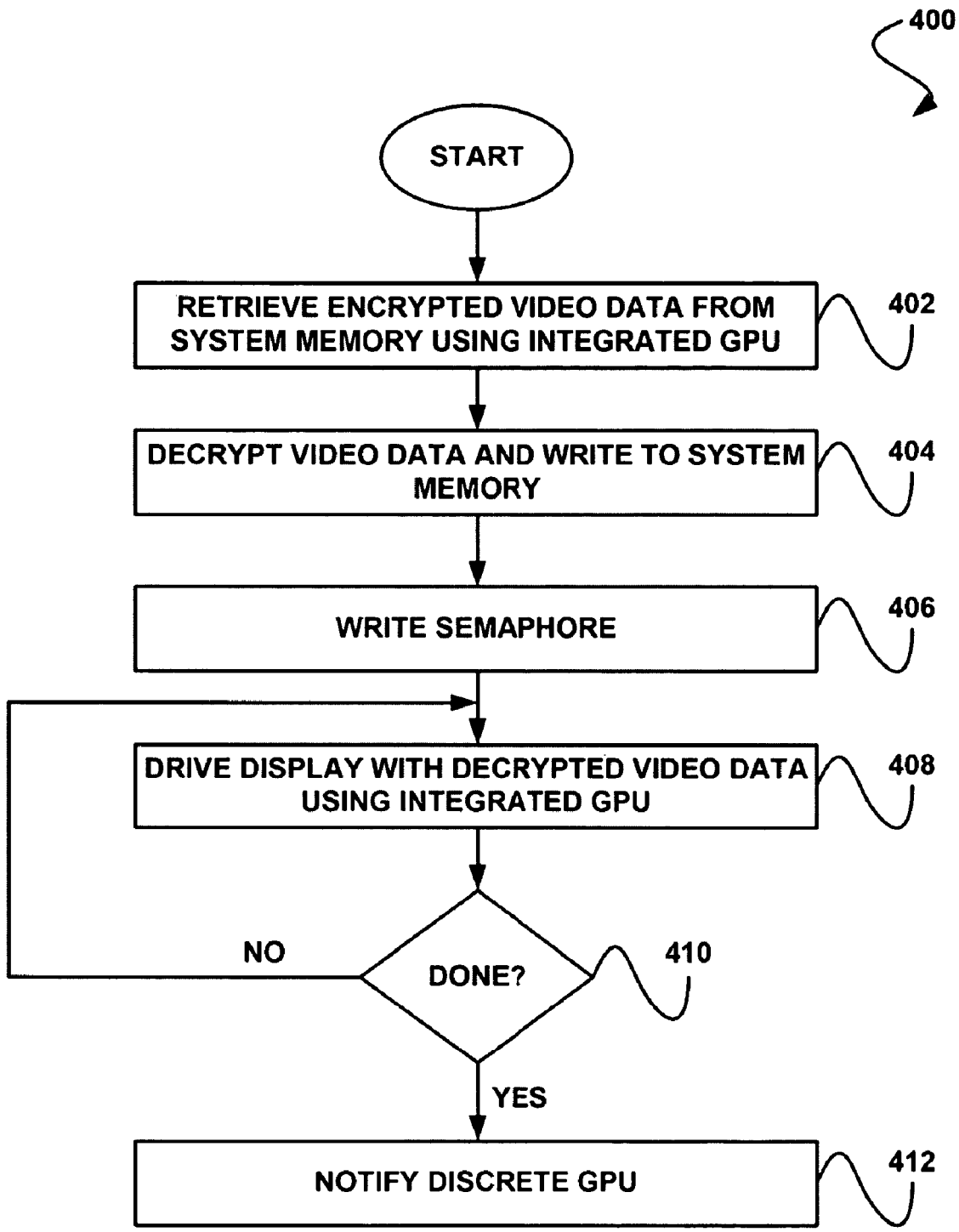
FIG. 4 shows a method for driving a display with decrypted video data utilizing an integrated GPU, in accordance with still yet another embodiment.

FIG. 4 shows a method 400 for driving a display with decrypted video data utilizing an integrated GPU, in accordance with still yet another embodiment. As an option, the present method 400 may be carried out in the context of the functionality and architecture of FIGS. 1-3. Of course, however, the method 400 may be carried out in any desired environment. Again, it should be noted that the aforementioned definitions may apply during the present description.

As shown in operation 402, encrypted video data is retrieved from system memory using an integrated GPU. In one embodiment, the encrypted video data may be retrieved by reading the encrypted video data. In another embodiment, the encrypted video data may be retrieved in response to a determination that a semaphore indicates the encrypted video data has been transferred to the system memory.

Additionally, the video data is decrypted and written to system memory, as shown in operation 404. With respect to the present embodiment, the video data may be decrypted and written to system memory utilizing the integrated GPU. As an option, the video data may be decrypted utilizing a key established during a driver initialization (e.g. see operation 304 of FIG. 3).

Further, a semaphore is written. Note operation 406. The semaphore may be written by the integrated GPU, for example. With respect to the present embodiment, the semaphore may include a location in the system memory dedicated to providing an indication of whether encrypted video data has been retrieved from system memory. For example, if the semaphore indicates that encrypted video data has been retrieved from system memory, such indication may allow a discrete GPU to store additional encrypted video data in the system memory. Thus, the semaphore may be written with a predetermined value indicating that the encrypted video data has been retrieved.

Moreover, as shown in operation 408, a display is driven with the decrypted video data using the integrated GPU. For example, the integrated GPU may scan the decrypted video data to the display. In this way, the decrypted video data may be displayed.

In decision 410 it is determined whether the integrated GPU is finished driving the display with the video data. For example, it may be determined whether all of the video data has been displayed. If it is determined that the integrated GPU is not finished driving the display with the video data, the method 400 continues to allow the display to be driven with the decrypted video data using the integrated GPU.

If, however, it is determined that the integrated GPU is finished driving the display with the video data, the discrete GPU is notified. Note operation 412. In one embodiment, the discrete GPU may be notified utilizing the semaphore. For example, once the integrated GPU is finished driving the display with the video data, a host processor may check the semaphore to determine whether the semaphore indicates that the encrypted video data has been retrieved, and may notify the discrete GPU that the encrypted video data has been retrieved. In this way, the discrete GPU may be allowed to store additional encrypted video data in the system memory.

Figure 5:
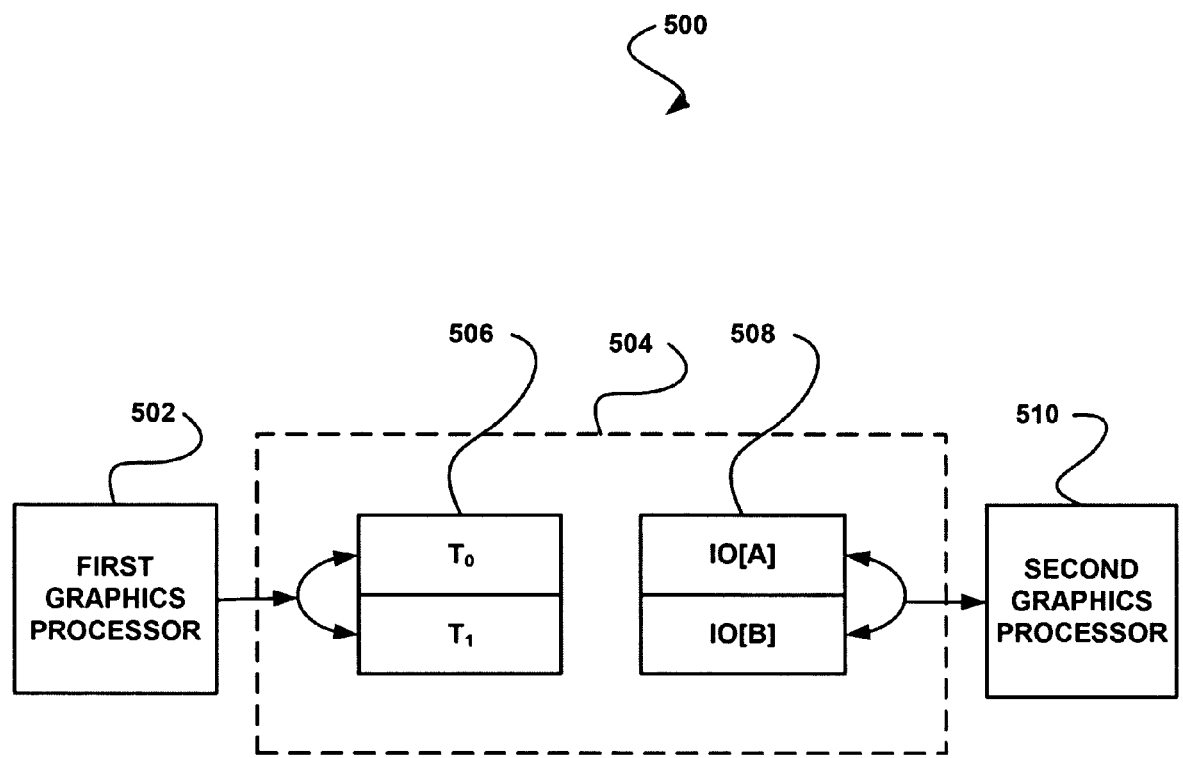
FIG. 5 shows a system for synchronizing a plurality of GPUs, in accordance with another embodiment.

FIG. 5 shows a system 500 for synchronizing a plurality of GPUs, in accordance with another embodiment. As an option, the present system 500 may be implemented in the context of the functionality and architecture of FIG. 14. Of course, however, the system 500 may be implemented in any desired environment. Yet again, it should be noted that the aforementioned definitions may apply during the present description.

As shown, a first graphics processor 502 and a second graphics processor 510 are in communication with system memory 504. With respect to the present embodiment, the first graphics processor 502 may include a discrete graphics processor. Also with respect to the present embodiment, the second graphics processor 510 may include an integrated graphics processor.

In addition, the system memory 504 includes an encrypted portion 506 and a decrypted portion 508. The encrypted portion 506 may include a plurality of buffers ($T_0$ and $T_1$) for storing encrypted video data therein. The decrypted portion 508 may also include a plurality of buffers (IO[A] and IO[B]) for storing decrypted video data therein.

The buffers of the encrypted portion 506 may be alternately used by the first graphics processor 502 for storing the encrypted video therein. Similarly, the buffers of the decrypted portion 508 may be alternately used by the second graphics processor 510 for storing decrypted video data therein.

For example, in one embodiment, the first graphics processor 502 may receive first video data from an application. The first video data may include a frame a video data, for example. The first graphics processor 502 may process the first video data and encrypt the first video data. Upon encryption of the first video data, the first graphics processor 502 may write such encrypted first video data to a first buffer ($T_0$) of the encrypted portion 506 of system memory 504.

After writing the encrypted first video data to the first buffer of the encrypted portion 506, the first graphics processor 502 may release a first semaphore associated with the first buffer of the encrypted portion 506. For example, the first graphics processor 502 may write a value to the first semaphore predetermined for indicating that encrypted video data has been written to the first buffer.

To this end, the second graphics processor 510 may identify the release of the first semaphore (e.g. based on a polling of the first semaphore, etc.) and may acquire the first semaphore. The first semaphore may be acquired by writing a value to the first semaphore predetermined for indicating that encrypted video data stored in the first buffer is in the process of being read. Further, the second graphics processor 510 may read the encrypted video data stored in the first buffer of the encrypted portion 506.

While the second graphics processor 510 has the first semaphore acquired, the first graphics processor 502 may receive second video data from the application, process the second video data, encrypt the second video data, and store such encrypted second video data in a second buffer ($T_1$) of the encrypted portion 506 of system memory 504. After storing the encrypted second video data in the second buffer of the encrypted portion 506, the first graphics processor 502 may release a second semaphore associated with the second buffer of the encrypted portion 506.

Upon reading of the encrypted video data from the first buffer of the encrypted portion 506 by the second graphics processor 510, the second graphics processor 510 may release the first semaphore (e.g. by writing a value to the first semaphore predetermined for indicating that encrypted video data stored in the first buffer has been being read). Accordingly, the first graphics processor 502 may identify the release of the first semaphore (e.g. based on a polling of the first semaphore, etc.) and may acquire the first semaphore for storing yet other video data in the first buffer of the encrypted portion 506. To this end, after an initial storage of encrypted video data in the buffers of the encrypted portion 506, the first graphics processor 502 may alternate storage of encrypted video data among the plurality of buffers of such encrypted portion 506, based on a release of semaphores associated with the buffers of the encrypted portion 506 by the second graphics processor 510.

Moreover, upon receipt of encrypted video data by the second graphics processor 510, the second graphics processor 510 may decrypt the encrypted video data. The second graphics processor 510 may also acquire a third semaphore associated with a first buffer (IO[A]) of the decrypted portion 508 of the system memory 504. Acquiring the third semaphore associated with the first buffer of the decrypted portion 508 may include writing a value to the third semaphore indicating that decrypted video data is in the process of being written to the first buffer of the decrypted portion 508.

The second graphics processor 510 may decrypt the retrieved encrypted video data and write the decrypted video data to the first buffer of the decrypted portion 508 of system memory 504. The second graphics processor 510 may release the third semaphore upon the decrypted video data being written to the first buffer of the decrypted portion 508. Upon release of the third semaphore, the second graphics processor 510 may further read the decrypted video data from the first buffer of the decrypted portion 508 and may display such decrypted video data on a display.

While the decrypted video data is being displayed, the second graphics processor 510 may identify release of the second semaphore associated with the second buffer of the encrypted portion 506 by the first graphics processor 502 and may acquire the second semaphore. Moreover, the second graphics processor 510 may read the encrypted video data stored in the second buffer of the encrypted portion 506.

Once the encrypted video data is read from the second buffer of the encrypted portion 506, the second graphics processor 510 may release the second semaphore associated with the second buffer of the encrypted portion 506, such that the first graphics processor 502 may be allowed to write other encrypted video data thereto, as noted above. Upon receipt of encrypted video data by the second graphics processor 510, the second graphics processor 510 may decrypt the encrypted video data. The second graphics processor 510 may also acquire a fourth semaphore associated with a second buffer (IO[B]) of the decrypted portion 508 of the system memory 504.

The second graphics processor 510 may decrypt the retrieved encrypted video data and write the decrypted video data to the second buffer of the decrypted portion 508 of system memory 504. The second graphics processor 510 may release the fourth semaphore upon the decrypted video data being written to the second buffer of the decrypted portion 508. Upon release of the fourth semaphore, the second graphics processor 510 may further read the decrypted video data from the second buffer of the decrypted portion 508 and may display such decrypted video data on a display. After an initial storage of decrypted video data in the buffers of the decrypted portion 508 of the system memory 504, the second graphics processor 510 may alternate storage of decrypted video data among the buffers of such decrypted portion 508, based on a release of semaphores associated with the buffers of the decrypted portion 508 by the second graphics processor 510.

Thus, in one exemplary embodiment and with respect to the encrypted portion 506 of the system memory 504, the first graphics processor 502 may write encrypted video data to a first buffer ($T_0$) of the system memory 504, and the second graphics processor 510 may read encrypted video data from the second buffer ($T_1$) of the system memory 504 when (e.g. while) the first graphics processor writes the encrypted video data to the first buffer ($T_0$) of the system memory 504. Additionally, the first graphics processor 502 may write encrypted video data to the second buffer ($T_1$) of the system memory 504, and the second graphics processor 510 may read encrypted video data from the first buffer ($T_0$) of the system memory 504 when the first graphics processor 502 writes the encrypted video data to the second buffer ($T_1$) of the system memory 504. Alternating use of the buffers in this manner may optionally prevent delay associated with writing video data to and reading video data from the buffers by the first graphics processor 502 and the second graphics processor 510.

In another exemplary embodiment, as noted above, the semaphores may be used for ensuring that the second graphics processor 510 refrains from reading the encrypted video data from the first buffer ($T_0$) of the system memory 504 until the first graphics processor 502 has completed writing the encrypted video data to the first buffer ($T_0$) of the system memory 504. In addition, the semaphores may also ensure that the second graphics processor 510 refrains from reading the encrypted video data from the second buffer ($T_1$) of the system memory 504 until the first graphics processor 502 has completed writing the encrypted video data to the second buffer ($T_1$) of the system memory 504.

Figure 6:
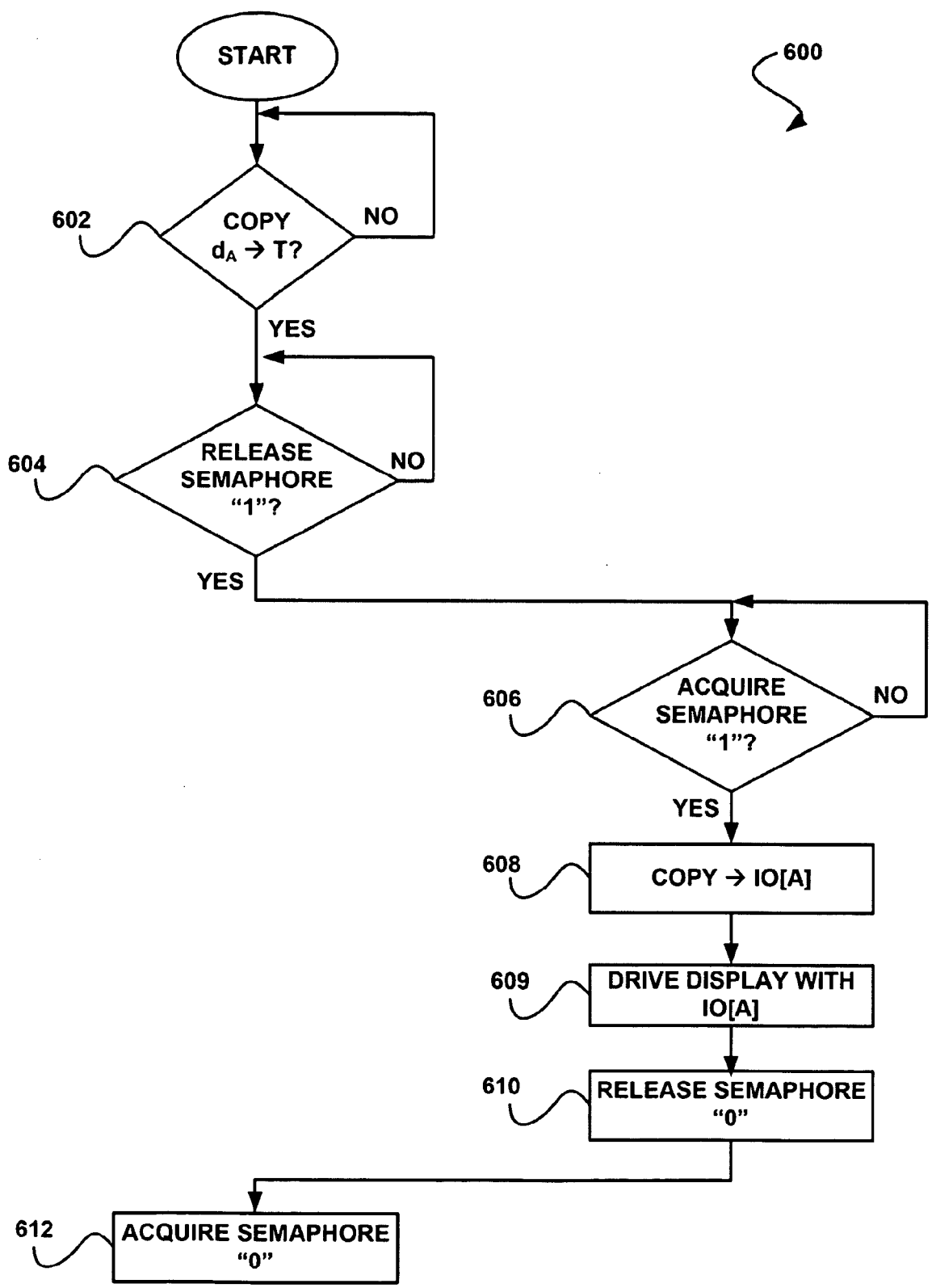
FIG. 6 shows a method for synchronizing a plurality of GPUs utilizing a semaphore, in accordance with yet another embodiment.

FIG. 6 shows a method 600 for synchronizing a plurality of GPUs utilizing a semaphore, in accordance with yet another embodiment. As an option, the present method 600 may be carried out in the context of the functionality and architecture of FIGS. 1-5. Of course, however, the method 600 may be carried out in any desired environment. Again, it should be noted that the aforementioned definitions may apply during the present description.

As shown in decision 602, it is determined whether a discrete graphics processor copies (e.g. writes) encrypted video data from a local buffer ($d_A$) to an encrypted portion (T) of system memory. Such local memory may include memory local to the discrete graphics processor, for example. If it is determined that the discrete graphics processor does not copy encrypted video data from the local buffer to the encrypted portion of system memory, the method continues to wait for the discrete graphics processor to copy encrypted video data from the local buffer to the encrypted portion of system memory.

If it is determined that the discrete graphics processor copies encrypted video data from the local buffer to the encrypted portion of system memory, it is determined whether the discrete graphics processor releases a semaphore (e.g. by writing the value "1" to the semaphore). Note decision 604. With respect to the present embodiment, the discrete graphics processor may release the semaphore after the copying of encrypted video data from the local buffer to the encrypted portion of system memory is completed.

If it is determined that the discrete graphics processor has not released the semaphore, the method 600 continues to wait for the discrete graphics processor to release the semaphore. For example, the semaphore may be continuously polled for determining whether the value thereof indicates that the semaphore has been released.

If it is determined that the discrete graphics processor releases the semaphore, it is determined whether the semaphore is acquired (see decision 606). Just by way of example, the semaphore may be acquired by an integrated graphics processor upon a determination that the discrete graphics processor has released the semaphore. As shown, the semaphore may be acquired by writing a value "1" to the semaphore.

If it is determined that the semaphore is not acquired, the method 600 continues to wait for the semaphore to be acquired. If it is determined that the semaphore is acquired, the encrypted video data is read from the encrypted portion of system memory, is decrypted and is copied to an unencrypted portion (IO[A]) of system memory. Note operation 608.

Moreover, a video engine of the integrated graphics processor drives a display with the decrypted video data stored in the unencrypted portion of the system memory, as shown in operation 609. For example, the video engine may read the decrypted video data from the unencrypted portion of the system memory and may display such decrypted video data. Still yet, the semaphore is released (e.g. by writing a value "0" to the semaphore), as shown in operation 610. For example, the semaphore may be released by the integrated graphics processor.

As also shown, the semaphore may again be acquired (e.g. by writing a value "1" to the semaphore. Note operation 612 in one embodiment, the semaphore may be acquired by the discrete graphics processor upon the release of the semaphore by the integrated graphics processor. Accordingly, the discrete graphics processor may copy additional encrypted video data from the local buffer to the encrypted portion of the system memory.

Figure 7:
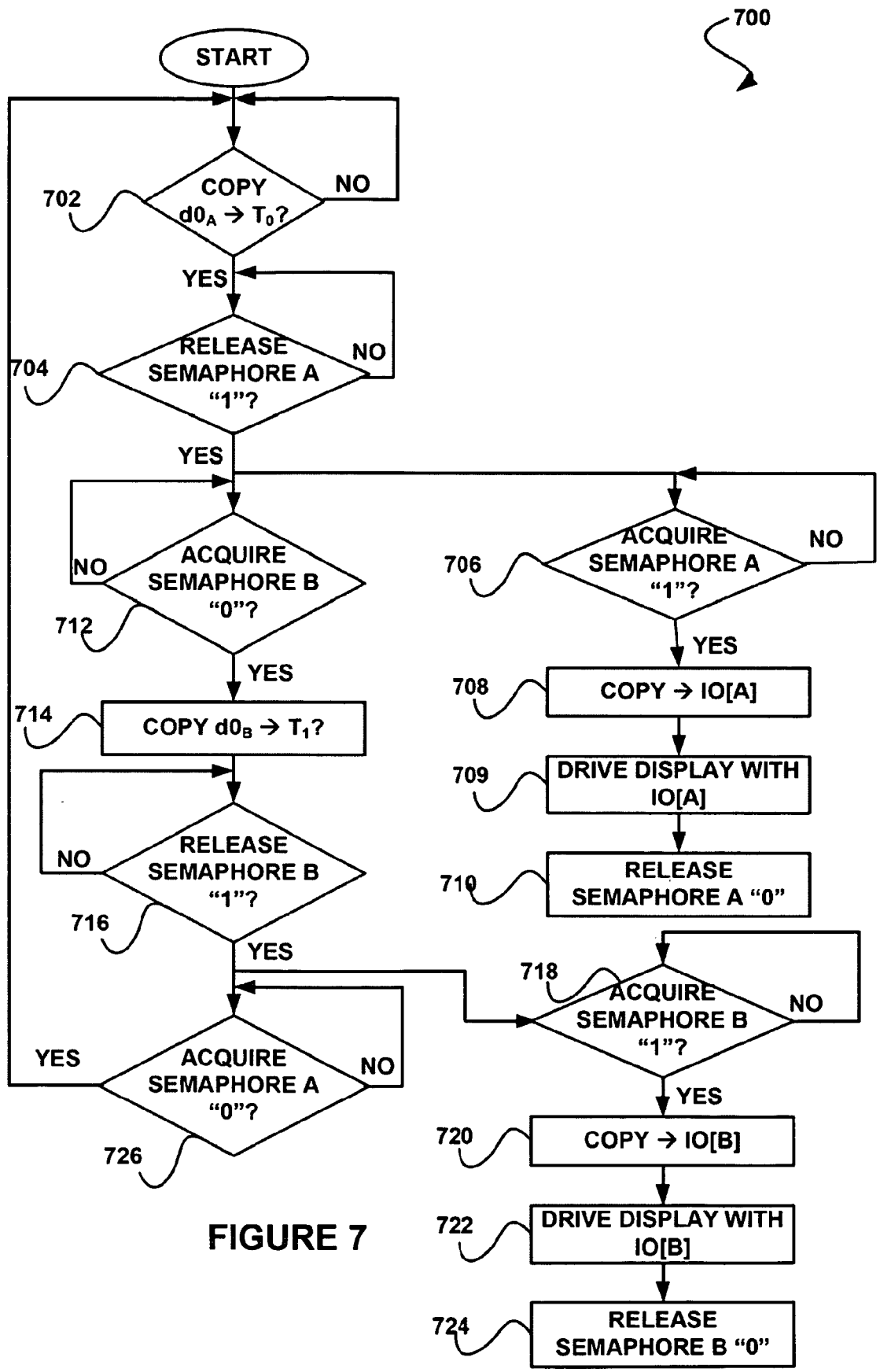
FIG. 7 shows a method for synchronizing a plurality of GPUs utilizing a plurality of semaphores, in accordance with still yet another embodiment.

FIG. 7 shows a method 700 for synchronizing a plurality of GPUs utilizing a plurality of semaphores, in accordance with still yet another embodiment. As an option, the present method 700 may be carried out in the context of the functionality and architecture of FIGS. 1-6. Of course, however, the method 700 may be carried out in any desired environment. Again, it should be noted that the aforementioned definitions may apply during the present description.

As shown in decision 702, it is determined whether a discrete graphics processor copies (e.g. writes) encrypted video data from a first local buffer ($d0_A$) to a first buffer ($T_0$) of an encrypted portion of system memory. Such first local buffer may include memory local to the discrete graphics processor, for example. If it is determined that the discrete graphics processor does not copy encrypted video data from the first local buffer to the first buffer of the encrypted portion of system memory, the method 700 continues to wait for the discrete graphics processor to copy encrypted video data from the first local buffer to the first buffer of the encrypted portion of system memory.

If it is determined that the discrete graphics processor copies encrypted video data from the first local buffer to the first buffer of the encrypted portion of system memory, it is determined whether the discrete graphics processor releases a first semaphore (e.g. by writing the value "1" to the first semaphore). Note decision 704. The first semaphore may be associated with the first buffer of the encrypted portion of system memory. With respect to the present embodiment, the discrete graphics processor may release the first semaphore after the copying of encrypted video data from the first local buffer to the first buffer of the encrypted portion of system memory is completed.

If it is determined that the discrete graphics processor has not released the first semaphore, the method 700 continues to wait for the discrete graphics processor to release the first semaphore. For example, the first semaphore may be continuously polled for determining whether the value thereof indicates that the first semaphore has been released.

If it is determined that the discrete graphics processor releases the first semaphore, parallel processing is performed, as shown. For example, operations 712-716 and 726 may be performed in parallel with any of operations 706-710 and 718-724. In one embodiment, it is determined whether the first semaphore is acquired (see decision 706). Just by way of example, the first semaphore may be acquired by an integrated graphics processor upon a determination that the discrete graphics processor has released the first semaphore. As shown, the first semaphore may be acquired by writing a value "1" to the first semaphore.

If it is determined that the first semaphore is not acquired, the method 700 continues to wait for the first semaphore to be acquired. If it is determined that the first semaphore is acquired, the encrypted video data is read from the first buffer of the encrypted portion of system memory, is decrypted and is copied to a first buffer of an unencrypted portion (IO[A]) of system memory. Note operation 708.

Moreover, a video engine of the integrated graphics processor drives a display with the decrypted video data stored in the first buffer of the unencrypted portion of the system memory, as shown in operation 709. For example, the video engine may read the decrypted video data from the first buffer of the unencrypted portion of the system memory and may display such decrypted video data. Still yet, the first semaphore is released (e.g. by writing a value "0" to the semaphore), as shown in operation 710. For example, the first semaphore may be released by the integrated graphics processor.

In another embodiment, it is determined whether the discrete graphics processor acquires a second semaphore. Note decision 712. Thus, while it is determined whether the integrated graphics processor acquires the first semaphore (decision 706), it may be determined whether the discrete graphics processor acquires the second semaphore (decision 712).

The second semaphore may be associated with a second buffer of the encrypted portion of system memory. With respect to the present embodiment, the discrete graphics processor may acquire the second semaphore only if the second semaphore has been released (e.g. by the integrated graphics processor). Acquiring the second semaphore may include writing the value "0" in the second semaphore, for indicating that encrypted video data is being written to the second buffer of the encrypted portion of the system memory.

If it is determined that the second semaphore is not acquired by the discrete graphics processor, the method 700 continues to wait for the discrete graphics processor acquire the second semaphore. If it is determined that the second semaphore is acquired by the discrete graphics processor, the discrete graphics processor copies (e.g. writes) other encrypted video data from a second local buffer ($d0_B$) to a second buffer ($T_1$) of an encrypted portion of system memory. Note operation 714. Such second local buffer may include memory local to the discrete graphics processor, for example. If it is determined that the discrete graphics processor does not copy encrypted video data from the second local buffer to the second buffer of the encrypted portion of system memory, the method 700 continues to wait for the discrete graphics processor to copy encrypted video data from the second local buffer to the second buffer of the encrypted portion of system memory.

If it is determined that the discrete graphics processor copies encrypted video data from the second local buffer to the second buffer of the encrypted portion of system memory, it is determined whether the discrete graphics processor releases the second semaphore (e.g. by writing the value "1" to the second semaphore). Note decision 716. The second semaphore may be associated with the second buffer of the encrypted portion of system memory. With respect to the present embodiment, the discrete graphics processor may release the second semaphore after the copying of encrypted video data from the second local buffer to the second buffer of the encrypted portion of system memory is completed.

If it is determined that the discrete graphics processor has not released the second semaphore, the method 700 continues to wait for the discrete graphics processor to release the second semaphore. For example, the second semaphore may be continuously polled for determining whether the value thereof indicates that the second semaphore has been released.

If it is determined that the discrete graphics processor releases the second semaphore, parallel processing is performed, as shown. In one embodiment, it is determined whether the second semaphore is acquired (see decision 718). Just by way of example, the second semaphore may be acquired by the integrated graphics processor upon a determination that the discrete graphics processor has released the second semaphore. As shown, the second semaphore may be acquired by writing a value "1" to the second semaphore.

If it is determined that the second semaphore is not acquired, the method 700 continues to wait for the second semaphore to be acquired. If it is determined that the second semaphore is acquired, the encrypted video data is read from the second buffer of the encrypted portion of system memory, is decrypted and is copied to a second buffer of an unencrypted portion (IO[B]) of system memory. Note operation 720.

Moreover, a video engine of the integrated graphics processor drives a display with the decrypted video data stored in the second buffer of the unencrypted portion of the system memory, as shown in operation 722. For example, the video engine may read the decrypted video data from the second buffer of the unencrypted portion of the system memory and may display such decrypted video data. Still yet, the second semaphore is released (e.g. by writing a value "0" to the second semaphore), as shown in operation 724. For example, the second semaphore may be released by the integrated graphics processor.

In another embodiment, it is determined whether the discrete graphics processor acquires the first semaphore. Note decision 726. Thus, while it is determined whether the integrated graphics processor acquires the second semaphore (decision 718), determined whether the discrete graphics processor acquires the first semaphore (decision 726).

Thus, the first semaphore may again be acquired (e.g. by writing a value "1" to the first semaphore) by the discrete graphics processor. In one embodiment, the first semaphore may be acquired by the discrete graphics processor upon the release of the first semaphore by the integrated graphics processor. Accordingly, the discrete graphics processors may copy additional encrypted video data from the first local buffer to the first buffer of the encrypted portion of the system memory (decision 702).

Figure 8:
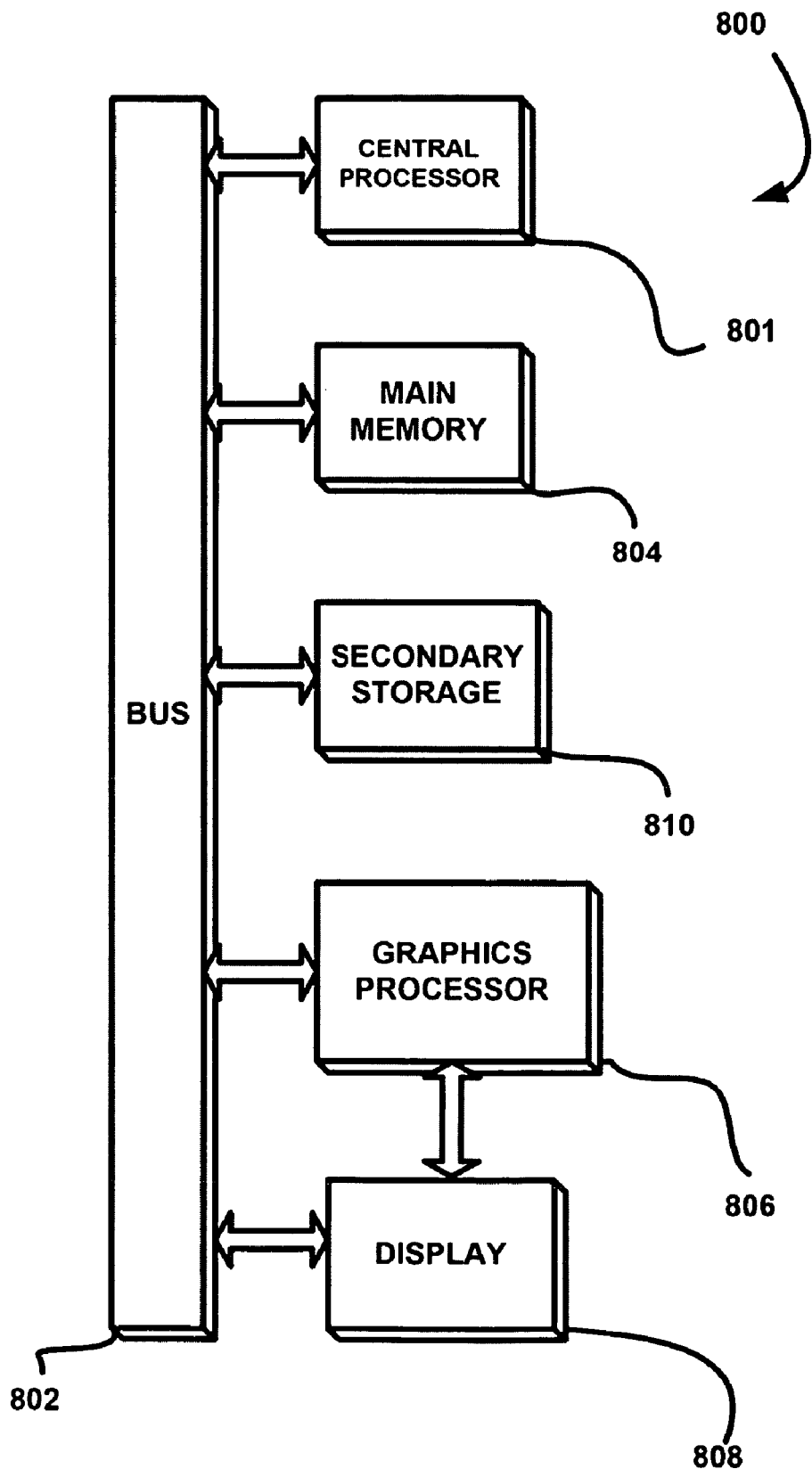
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, system 800 is provided including at least one host processor 801 which is connected to a communication bus 802. The system 800 also includes a main memory 804. Control logic (software) and data are stored in the main memory 804 which may take the form of random access memory (RAM).

The system 800 also includes a graphics processor 806 and a display 808, i.e. a computer monitor. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 804 and/or the secondary storage 810. Such computer programs, when executed, enable the system 800 to perform various functions. Memory 804, storage 810 and/or any other storage are possible examples of computer-readable media.

In one embodiment, the architecture and/or functionality of the various previous figures may be implemented in the context of the host processor 801, graphics processor 806, an integrated circuit (not shown) that is capable of at least a portion of the capabilities of both the host processor 801 and the graphics processor 806, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, lap-top computer, and/or any other type of logic. Still yet, the system 800 may take the form of various other devices including, but not limited to, a personal digital assistant (PDA) device, a mobile phone device, a television, etc.

Further, while not shown, the system 800 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
    a driver;
    a system memory;
    a first graphics processor programmed with a key upon initialization of the graphics processor, the first graphics processor:
        receiving a command from the driver, the command referencing a virtual address associated with the system memory at which video data is to be stored,
        utilizing a page table to map the virtual address to an associated physical address in the system memory,
        determining that the associated physical address in the system memory is predetermined to be associated with a portion of the system memory that is protected with the key, the portion of the system memory that is protected with the key including a first buffer and a second buffer,
        encrypting the video data in response to the determination that the associated physical address is predetermined to be associated with the portion of the system memory that is protected with the key, and
        alternating storage of the encrypted video data between the first buffer and the second buffer based on a first semaphore associated with the first buffer and a second semaphore associated with the second buffer; and a second graphics processor programmed with the key upon initialization of the second graphics processor, the second graphics processor in communication with the first graphics processor and collaboratively processing the video data;

wherein the communication is encrypted and decrypted using the key;

wherein the alternating storage of the encrypted video data includes storing a first portion of the encrypted video data in the first buffer based on a release of the first semaphore associated with the first buffer by the second graphics processor and storing a second portion of the encrypted video data in the second buffer based on a release of the second semaphore associated with the second buffer by the second graphics processor.

2. The apparatus of claim 1, wherein the first graphics processor and the second graphics processor are symmetric.

3. The apparatus of claim 1, wherein the first graphics processor and the second graphics processor are asymmetric.

4. The apparatus of claim 3, wherein the first graphics processor includes a discrete graphics processor and the second graphics processor includes an integrated graphics processor integrated on a host system.

5. The apparatus of claim 4, wherein a plurality of the discrete graphics processors is included for collaboratively processing the video data.

6. The apparatus of claim 4, wherein the discrete graphics processor decodes the video data after receipt thereof.

7. The apparatus of claim 6, wherein the discrete graphics processor encrypts the video data after the decoding thereof.

8. The apparatus of claim 7, wherein the host system includes the system memory for storing the encrypted video data that is received from the discrete graphics processor.

9. The apparatus of claim 8, wherein the integrated graphics processor decrypts the encrypted video data.

10. The apparatus of claim 8, wherein a graphics engine of the integrated graphics processor decrypts the encrypted video data.

11. The apparatus of claim 10, wherein the integrated graphics processor writes the decrypted video data to the system memory.

12. The apparatus of claim 10, wherein a video engine of the integrated graphics processor drives a display utilizing the video data.

13. The apparatus of claim 12, wherein at least one third semaphore is utilized to coordinate processing by the graphics engine and the video engine of the integrated graphics processor.

14. The apparatus of claim 1, wherein the first semaphore and the second semaphore are utilized to coordinate processing by the first graphics processor and the second graphics processor.

15. The apparatus of claim 1, wherein the communication is carried out over a bus.

16. The apparatus of claim 15, wherein the bus includes a peripheral component interconnect (PCI) bus.

17. The apparatus of claim 1, wherein the first graphics processor and the second graphics processor each include a graphics processing unit.

18. The apparatus of claim 1, wherein the first graphics processor stores the encrypted video data in an encrypted portion of the system memory.

19. The apparatus of claim 1, wherein the first graphics processor stores the first portion of the encrypted video data in the first buffer of the portion of the system memory that is protected with the key while the second graphics processor reads the previously stored portion of the encrypted video data from the second buffer of the portion of the system memory that is protected with the key.

20. The apparatus of claim 1, wherein the first graphics processor stores the second portion of the encrypted video data in the second buffer of the portion of the system memory that is protected with the key while the second graphics processor reads the first portion of the encrypted video data from the first buffer of the portion of the system memory that is protected with the key.

21. A computer program product embodied on a non-transitory computer readable medium, comprising:

computer code for providing a key utilized to encrypt video data;

computer code for processing the video data utilizing a first graphics processor programmed with the key upon initialization of the graphics processor, the first graphics processor:

receiving a command from a driver, the command referencing a virtual address associated with a system memory at which the video data is to be stored, utilizing a page table to map the virtual address to an associated physical address in the system memory, determining that the associated physical address in the system memory is predetermined to be associated with a portion of the system memory that is protected with the key, the portion of the system memory that is protected with the key including a first buffer and a second buffer, encrypting the video data in response to the determination that the associated physical address is predetermined to be associated with the portion of the system memory that is protected with the key, and alternating storage of the encrypted video data between the first buffer and the second buffer based a first semaphore associated with the first buffer and a second semaphore associated with the second buffer; and computer code for further processing the video data utilizing a second graphics processor programmed with the key upon initialization of the second graphics processor, the second graphics processor in communication with the first graphics processor;

wherein the alternating storage of the encrypted video data includes storing a first portion of the encrypted video data in the first buffer based on a release of the first semaphore associated with the first buffer by the second graphics processor and storing a second portion of the encrypted video data in the second buffer based on a release of the second semaphore associated with the second buffer by the second graphics processor.

22. The computer program product of claim 21, wherein the computer code are components of the driver utilized for controlling the first graphics processor and the second graphics processor.

23. The computer program product of claim 21, wherein the key is provided to the second graphics processor for use in decrypting the encrypted video data.

24. A method, comprising:

processing video data utilizing a first graphics processor programmed with a key upon initialization of the graphics processor, the first graphics processor:

receiving a command from a driver, the command referencing a virtual address associated with a system memory at which the video data is to be stored, utilizing a page table to map the virtual address to an associated physical address in the system memory, determining that the associated physical address in the system memory is predetermined to be associated with a portion of the system memory that is protected with the key, the portion of the system memory that is protected with the key including a first buffer and a second buffer, encrypting the video data utilizing the key in response to the determination that the associated physical address is predetermined to be associated with the portion of the system memory that is protected with the key, and alternating storage of the encrypted video data between the first buffer or the second buffer based on a first semaphore associated with the first buffer and a second semaphore associated with the second buffer; and sending the video data to a second graphics processor programmed with the key upon initialization of the second graphics processor, the second graphics processor in communication with the first graphics processor and collaboratively processing the video data;

wherein the alternating storage of the encrypted video data includes storing a first portion of the encrypted video data in the first buffer based on a release of the first semaphore associated with the first buffer by the second graphics processor and storing a second portion of the encrypted video data in the second buffer based on a release of the second semaphore associated with the second buffer by the second graphics processor.

* * * * *